United States Patent
Tan et al.

(10) Patent No.: US 11,308,944 B2
(45) Date of Patent: Apr. 19, 2022

(54) INTENT BOUNDARY SEGMENTATION FOR MULTI-INTENT UTTERANCES

(71) Applicant: International Business Machines Corporation, Armonk, NY (US)

(72) Inventors: Ming Tan, Malden, MA (US); Haoyu Wang, Somerville, MA (US); Saloni Potdar, Arlington, MA (US); Yang Yu, Acton, MA (US); Navneet N. Rao, Arlington, MA (US); Haode Qi, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/816,600

(22) Filed: Mar. 12, 2020

(65) Prior Publication Data
US 2021/0287667 A1     Sep. 16, 2021

(51) Int. Cl.
*G10L 15/183*     (2013.01)
*G10L 15/06*     (2013.01)
*G06F 16/9032*     (2019.01)

(52) U.S. Cl.
CPC ...... *G10L 15/183* (2013.01); *G06F 16/90332* (2019.01); *G10L 15/063* (2013.01)

(58) Field of Classification Search
CPC .................. G10L 15/183; G10L 15/063; G06F 16/90332
See application file for complete search history.

(56) References Cited

U.S. PATENT DOCUMENTS

| 6,052,657 A | 4/2000 | Yamron et al. |
| 8,645,136 B2 | 2/2014 | Milstein |

(Continued)

FOREIGN PATENT DOCUMENTS

| CN | 110069709 A | * | 7/2019 |
| EP | 1012736 B1 | | 6/2000 |

(Continued)

OTHER PUBLICATIONS

Khashabi et al., Learning What is Essential in Questions, CoNLL, Aug. 2017, pp. 80-89 (Year: 2017).*

(Continued)

*Primary Examiner* — Sonia L Gay
(74) *Attorney, Agent, or Firm* — Francis Lammes; Stephen J. Walder, Jr.; Brian Welle (57) ABSTRACT

A mechanism is provided for implementing an intent segmentation mechanism that segments intent boundaries for multi-intent utterances in a conversational agent. For each term of a set of terms in the utterance from a real-time chat session, a set of adversarial utterances is generated for the utterance. An influence of changing each term is determined so as to identify a term importance value. Utilizing the term importance value, one or more of a change in ranking of the intent of the utterance or a change in confidence with regard to the intent of the utterance is identified. An entropy-based segmentation of the utterance into a plurality of candidate partitions is performed. An associated intent and entropy value are then assigned. Based on a segment with minimum entropy, a call associated with the real-time chat session is directed to an operation associated with an intent of the segment with minimum entropy.

20 Claims, 6 Drawing Sheets

(56) References Cited

U.S. PATENT DOCUMENTS

| | | |
|---|---|---|
| 10,191,999 B2 | 1/2019 | Liu et al. |
| 2005/0246177 A1 | 11/2005 | Long et al. |
| 2014/0244258 A1 | 8/2014 | Song et al. |
| 2019/0294673 A1 | 9/2019 | Sapugay et al. |

FOREIGN PATENT DOCUMENTS

| | | |
|---|---|---|
| IN | 201721044041 A | 6/2019 |
| JP | 4808160 B2 | 11/2011 |

OTHER PUBLICATIONS

Singh et al., Model Agnostic Interpretability of Rankers via Intent Modelling, FAT '20, Jan. 2020, p. 621 (Year: 2020).*

Dos Santos, Cicero et al., "Attentive Pooling Networks", arXiv:1602.03609v1 [cs.CL] Feb. 11, 2016, 10 pages.

Kim, Byeongchang et al., "Two-Stage Multi-Intent Detection for Spoken Language Understanding", Multimedia Tools and Applications, vol. 76, No. 9, Springer, May 2017, 14 pages.

Ribeiro, Marco T. et al., "Why Should I Trust You? Explaining the Predictions of Any Classifier", ACM SIGKDD 2016 Conference on Knowledge Discovery & Data Mining Aug. 13-17, 2016, San Francisco, USA, 10 pages.

Tan, Ming et al., "Improved Representation Learning for Question Answer Matching", Proceedings of the 54th Annual Meeting of the Association for Computational Linguistics, Berlin, Germany, Aug. 7-12, 2016, 10 pages.

\* cited by examiner

HI, – 0.00
CAN – 0.05
I – 0.20
ADD – 0.40
A – 0.15
DEPENDENT – 0.95
TO – 0.10
MY – 0.00
ACCOUNT – 0.15
12345678. – 0.10
ALSO, – 0.00
I – 0.20
WANT – 0.15
TO – 0.10
TALK – 0.30
TO – 0.10
A – 0.05
HUMAN – 0.25
AGENT – 0.20
ABOUT – 0.05
MY – 0.10
401K. – 0.35

INTENT "ADD DEPENDENT"

404

HI, – 0.00
CAN – 0.05
I – 0.20
ADD – 0.05
A – 0.15
DEPENDENT – 0.15
TO – 0.10
MY – 0.00
ACCOUNT – 0.25
12345678. – 0.10
ALSO, – 0.00
I – 0.20
WANT – 0.35
TO – 0.10
TALK – 0.45
TO – 0.10
A – 0.05
HUMAN – 0.60
AGENT – 0.75
ABOUT – 0.05
MY – 0.10
401K. – 0.35

INTENT "TALK TO AGENT"

INTENT BOUNDARY SEGMENTATION FOR MULTI-INTENT UTTERANCES

BACKGROUND

The present application relates generally to an improved data processing apparatus and method and more specifically to mechanisms for intent boundary segmentation for multi-intent utterances in a conversational agent.

A conversational agent is any dialogue system that not only conducts natural language processing but also responds automatically using human language. Conversational agents are used in many enterprises that interact with customers, such as decision support systems, customer support agents, informational chatbots for marketing, or the like. These conversation agents represent the practical implementation of computational linguistics, usually employed as chatbots over the internet or as portable device assistants.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for implementing an intent segmentation mechanism that segments intent boundaries for multi-intent utterances in a conversational agent. The illustrative embodiment, for each term of a set of terms in the utterance, generates a set of adversarial utterances for the utterance in response to identifying one or more possible intents in an utterance from real-time chat information from a real-time chat session. The illustrative embodiment determines an influence of changing each term by: determining a meaning of the utterance without the alternative term; determining a meaning of the utterance with the alternative term; and comparing the meaning of the utterance without the alternative term to the meaning of the utterance with the alternative term so as identify a term importance value. The illustrative embodiment utilizes the term importance value of each term in the set of terms in the utterance to identify one or more of a change in ranking of the intent of the utterance or a change in confidence with regard to the intent of the utterance. The illustrative embodiment utilizes the term importance value for each term in the set of terms in the utterance to perform entropy-based segmentation of the utterance into a plurality of candidate partitions. The illustrative embodiment assigns an associated intent based on ranking and confidence and entropy value to each segment of the utterance based on a sum of term importance values of the terms in the respective segment. Based on a segment with minimum entropy, the illustrative embodiment directs a call associated with the real-time chat session to an operation associated with the associated intent of the segment with minimum entropy.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, a conversational agent is any dialogue system that not only conducts natural language processing but also responds automatically using human language, and as such conversational agents are used in many enterprises that interact with customers, such as decision support systems, customer support agents, informational chatbots for marketing, or the like. Intent classification for a dialogue system plays an essential role in dialogue tree execution policy. That is, a user may express multiple requests or elaborate their issues in multiple steps in one utterance. Thus, one utterance from a user may comprise multiple intents and a prediction of related intents may be negatively influenced by each other. Current dialogue systems express difficulty in deciding which part of the utterance is related to which intent and therefore, experience difficulty in perform multiple dialogue executions for each intent of the utterance.

Current intent classifiers of such dialogue systems operate suboptimally. That is, single-class and multi-class classifiers cannot detect multiple intents. In multi-label classifiers, inference results lose the order of the intent and this sequential information of involved intents is crucial for understanding user behavior. Furthermore, multi-label classifiers cannot assign related information (e.g. detected entities) to corresponding intents. Additionally, performing simple sentence segmentation based on punctuations and then intent classification for each part is also suboptimal, because intents may be correlated with each other based on context and, sometimes, punctuations are missing. Thus, essentially, current dialogue systems lack fine-grained (token/term-level) intent analysis to separate sentences based on intent labels.

The illustrative embodiments provide an intent segmentation mechanism that segment intent boundaries for multi-intent utterances in a conversational agent. Initially, the intent segmentation mechanism identifies a set of top-K candidate intents within an utterance from a chat occurring within the conversation agent. The intent segmentation mechanism then performs term/token-level importance analysis for each top-K candidate intent. For all possible solutions of separating the utterance into K−1 segments, the intent segmentation mechanism detects boundaries for each intent by minimizing the entropy. After segmenting the utterance into multiple intents, the intent segmentation mechanism may perform two different operations. The first operation is to utilize the identified segmentation as additional training data for further training of the conversational agent thereby improving the operation of the conversations agent in analyzing later conversations and identifying multiple intents within the utterances of the conversation. The second operation is optimally handling the each identified intent. That is, based on the identified intents, intent segmentation mechanism priorities the intents and then provides direction of which intent to direct to which further operation, service personnel, agent, representative, or the like, in which order, thereby improving the operation of the conversational agent and improving user satisfaction.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
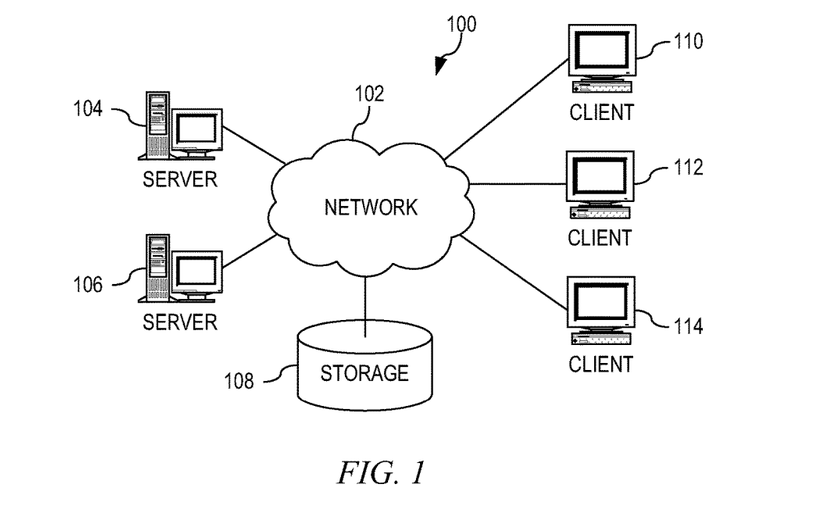
FIG. 1 is an example diagram of a distributed data processing system in which aspects of the illustrative embodiments may be implemented.
Figure 2:
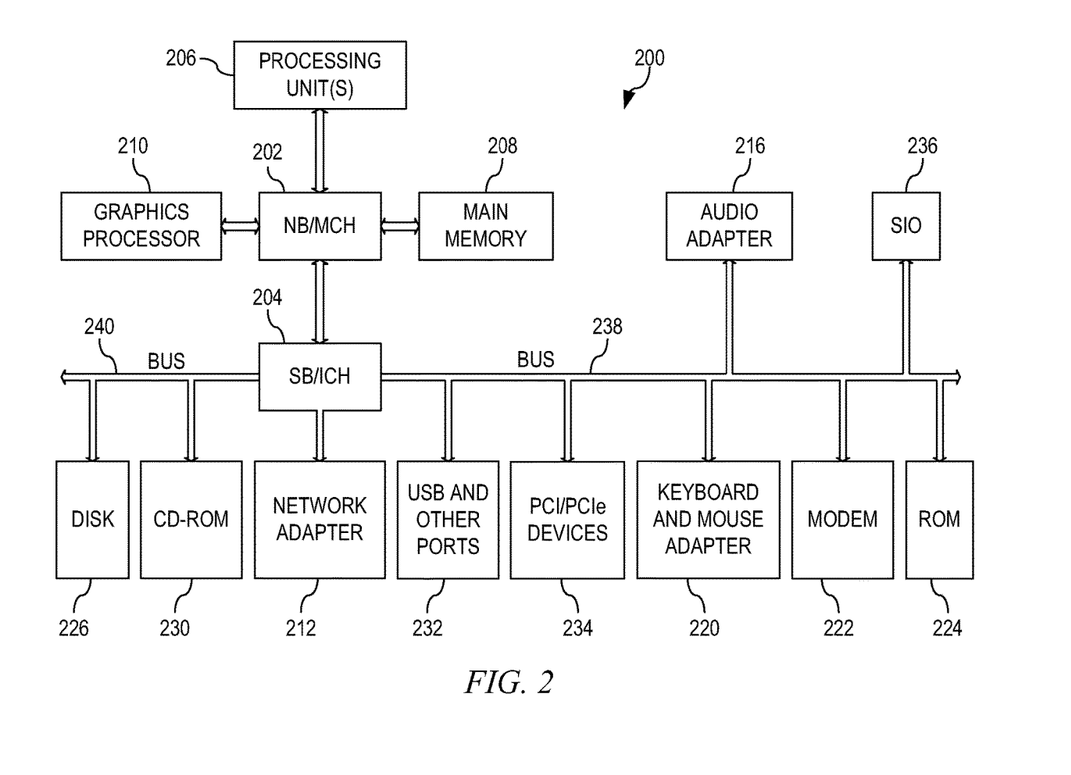
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an intent segmentation mechanism that segments intent boundaries for multi-intent utterances in a conversational agent. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the segmentation of intent boundaries for multi-intent utterances in a conversational agent.

As noted above, the mechanisms of the illustrative embodiments utilize specifically configured computing devices, or data processing systems, to perform the operations for segmenting intent boundaries for multi-intent utterances in a conversational agent. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the segmentation of intent boundaries for multi-intent utterances in a conversational agent.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
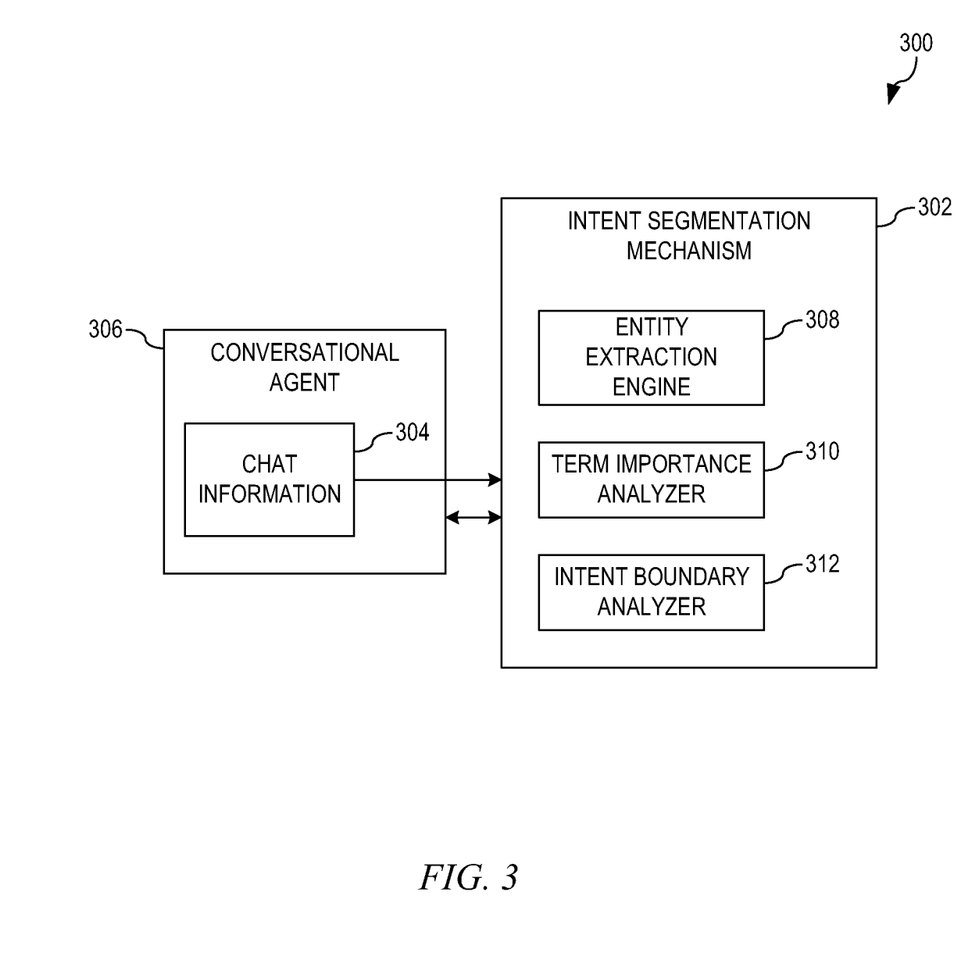
FIG. 3 depicts one example of an intent segmentation mechanism that segments intent boundaries for multi-intent utterances in a conversational agent in accordance with an illustrative embodiment.

FIG. 3 depicts one example of an intent segmentation mechanism that segments intent boundaries for multi-intent utterances in a conversational agent in accordance with an illustrative embodiment. Data processing system 300 comprises intent segmentation mechanism 302 that receives real-time chat information 304 from conversational agent 306. In accordance with the illustrative embodiment, real-time chat information 304 is resultant text from a speech-to-text engine (not shown) within conversational agent 306. Intent segmentation mechanism 302 further comprises entity extraction engine 308, term importance analyzer 310, and intent boundary analyzer 312. Upon receiving real-time chat information 304, entity extraction engine 308 utilizes natural language processing to identify one or more entities within an utterance of real-time chat information 304, the one or more entities defined specifically for business use cases by the customers, such as locations, organizations, times, or the like. For example, in the utterance of "Hi, can I add a dependent to my account 12345678. Also, I want to talk to a human agent about my 401k," entity extraction engine 308 utilizes natural language processing to identify two entities: "account 12345678" and "401k." Entity extraction engine 308 then utilizes semantic classification, text classification, or the like, to identify the possible intent associated with each identified entity, which results in identifying a first intent of "add a dependent" associated with the entity "account 12345678" and a second intent of "talk to an agent" associated with the entity of "401k."

Given this utterance and with any number of identified intents greater than one (although the example only illustrates two entities), term importance analyzer 310 generates a set K adversarial utterances by removing each term, set of terms, phrase, or the like, and replacing the term, set of terms, phrase, or the like, with an alternative term, set of terms, phrase, or the like. That is, in generating the set K adversarial utterances, in one embodiment, term importance analyzer 310 may utilize one or more different approaches to generate a set K adversarial utterances by, for example, replacing terms with paraphrasing terms, randomly sampling replacement words by language models, utilize replacement terms that involve typos, or the like. In generating the set K adversarial utterances, term importance analyzer 310 may also delete a term.

Term importance analyzer 310 then tests an influence of changing each the term, set of terms, phrase, or the like, in the utterance utilizing the following equations:

$$\Delta L = S_{before} - S_{after}$$
$$S = \alpha \frac{1}{\log(pos+1)} + \beta \cdot \text{confidence}$$

where $\Delta L$ is a result of a difference of a score before ($S_{before}$) the change of the term and a score after ($S_{after}$) the change of the term and the evaluation score S considers the effects of both position (pos) in the meaning prediction list for this meaning and the probability (confidence) of the meaning. That is, for each term in each sentence of the utterance, term importance analyzer 310 changes the term, determines a meaning of the sentence, and compares that meaning to the original sentence so as to determine whether the meaning of the sentence has changed thereby indicating term importance. By testing the influence of changing a term, set of terms, phrase, or the like, in the utterance, term importance analyzer 310 identifies one or more of a change in ranking of the intent of the utterance and/or a change in confidence with regard to the intent of the utterance. That is, if a word in the utterance is replaced with some random word(s) or the word is just deleted, an adversarial utterance is obtained that looks similar to the original utterance but the intent of the adversarial utterance may be ranked lower or be considered less confident than the original utterance or another adversarial utterance because an important word for the meaning was changed or lost.

Figure 4:
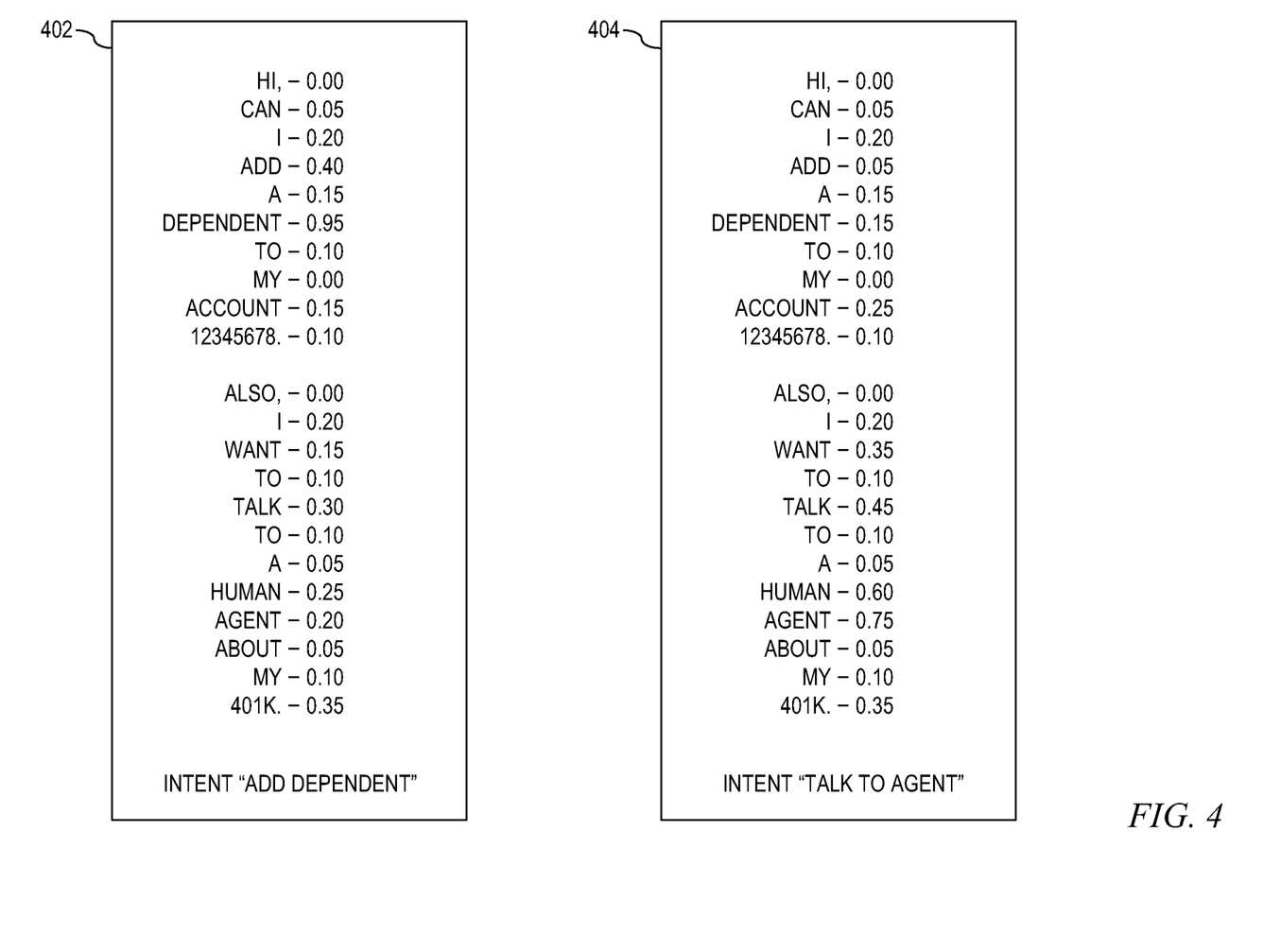
FIG. 4 provides one example of identifying an influence of changing each the term, set of terms, phrase, or the like, in the utterance in accordance with an illustrative embodiment.

FIG. 4 provides one example of identifying an influence of changing each the term, set of terms, phrase, or the like, in the utterance in accordance with an illustrative embodiment. In both table 402 and 404, a term with an influence value closer to 1.00 indicates that that term influences the intent of the sentence more than a term with an influence value closer to 0. Thus, in table 402, when considering the identified intent of "add dependent," term importance analyzer 310 identifies that a change to the terms "add" and "dependent" directly influences the intent of the utterance. In table 402, when considering the identified intent of "talk to agent," term importance analyzer 310 identifies that a change to the terms "talk," "human," and "agent" directly influences the intent of the utterance.

Once term importance analyzer 310 has completed term importance analysis, intent boundary analyzer 312 performs an entropy-based segmentation of the utterance. While in some cases where the speech-to-text engine of conversational agent 306 is able to separate an utterance into grammatically based sentences, oftentimes the speech-to-text analysis may generate long sentences that have little or no punctuation. Therefore, while intent boundary analyzer 312 may utilize punctuation to segment an utterance into a plurality of intents, intent boundary analyzer 312 also operates to segment an utterance into a plurality of intents in utterances that contain little or no punctuation. Initially, intent boundary analyzer 312 separates the utterance into a plurality of candidate partitions, which may be based on punctuation or semantics of the utterance. Then for each candidate partition, intent boundary analyzer 312 determines a probability of each intent base on summing the ΔLs of all the terms as identified by term importance analyzer 310. With the utterance segmented into the plurality of intents, intent boundary analyzer 312 assigns an intent to each partition based on the term influence values associated with the particular partition.

Figure 5:
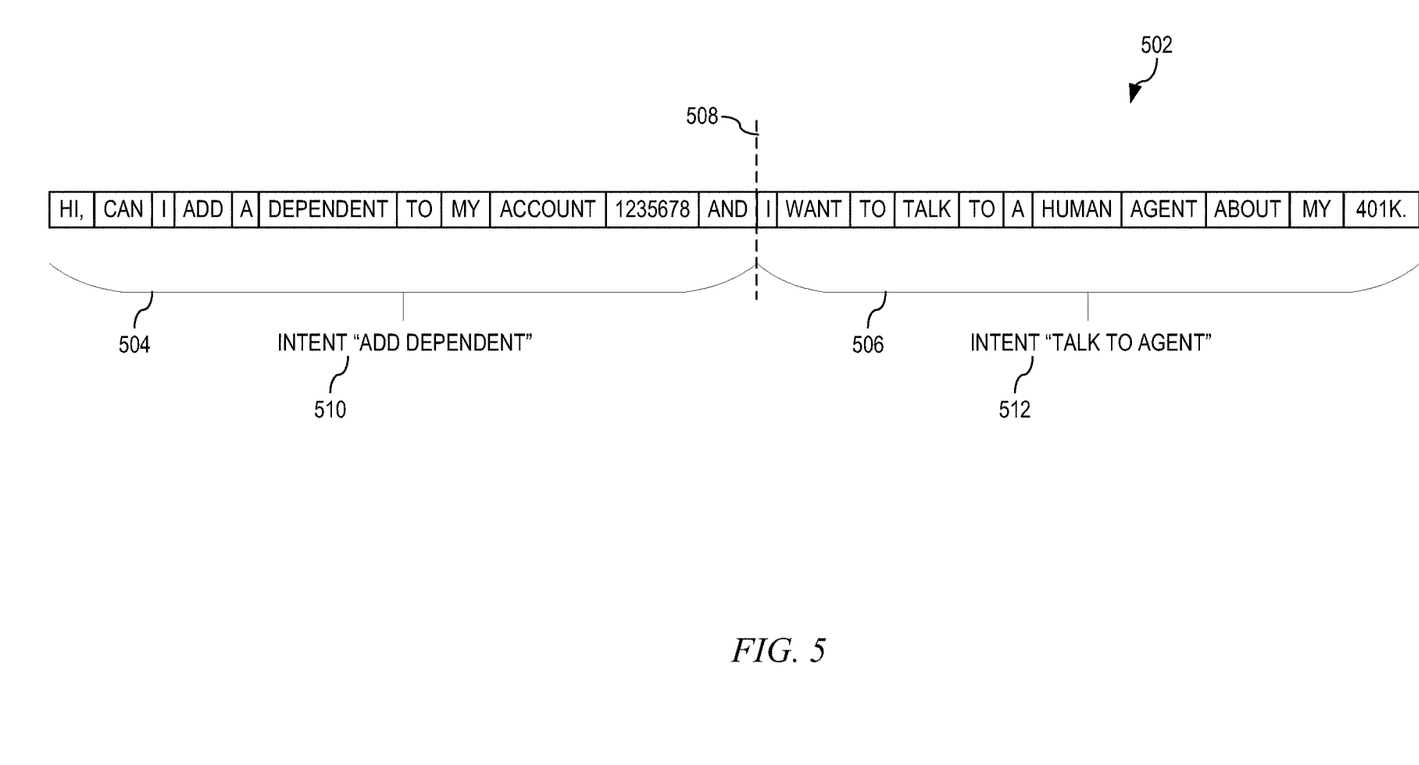
FIG. 5 illustrates one example of intent boundary analyzer 312 initially segmenting an utterance into a plurality of segments in accordance with an illustrative embodiment.
Figure 6:
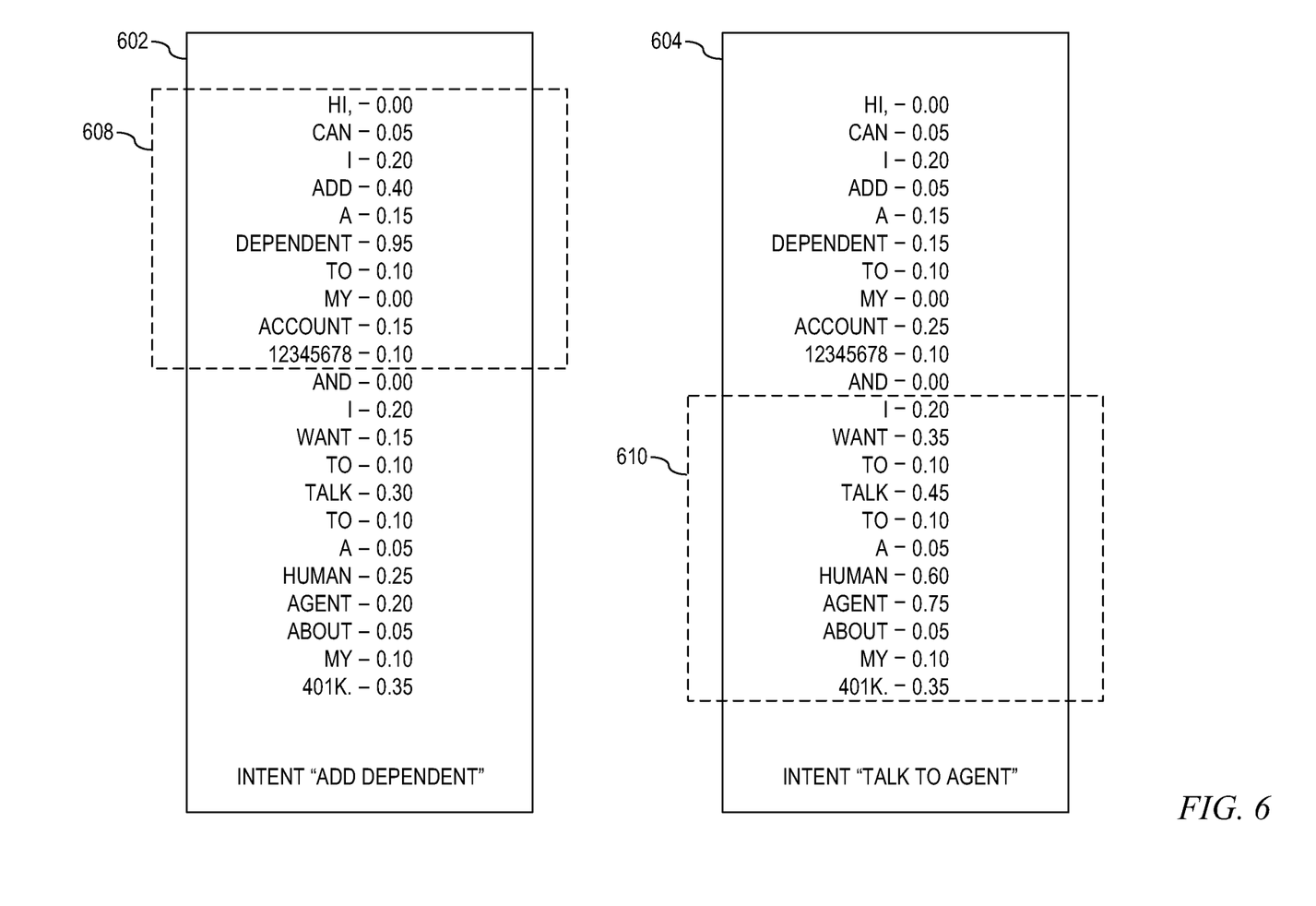
FIG. 6 provides an example of segmenting an utterance into a plurality of segments base on summing the ΔLs in accordance with an illustrative embodiment.

FIG. 5 illustrates one example of intent boundary analyzer 312 initially segmenting an utterance into a plurality of segments in accordance with an illustrative embodiment. As is illustrated, utterance 502 is segmented into segments 504 and 506, as indicated by line 508, based on sentence semantics utilizing the conjunction "and." FIG. 5 further illustrates assigning intents 510 and 512 to each partition based on the term influence values associated with the particular partition. FIG. 6 provides an example of segmenting an utterance into a plurality of segments base on summing the ΔLs in accordance with an illustrative embodiment. In this Figure, entity 606 within table 602 and entity 608 within table 604 are separated by boundaries indicated by the dashed boxes, which are correlated with their belonging intent.

Returning to FIG. 3, based on the candidate partition with minimum entropy, intent boundary analyzer 312 assigns priority to that associated intent, this is then passed back to conversational agent 306. In accordance with one illustrative embodiment, intent boundary analyzer 312 computes minimum entropy by testing every boundary between any adjacent two words. Referring to FIG. 6, intent boundary analyzer 312 computes an average entropy of the blocks split by the boundary between "12345678" and "AND". Intent boundary analyzer 312 goes through each boundary and find the one with the minimum average entropy. To compute the entropy of each block for a specific boundary split, intent boundary analyzer 312 sums the important scores for each label, performs a softmax operation with respect to all labels to get the probability score for this block belonging to each label P(label|block); computes the entropy for this block based on the probabilities following the standard definition of entropy; and compute the average entropies among all blocks split by the specific boundary.

In one embodiment, conversational agent 306 utilizes the assigned priority to direct the call associated with the chat session to a further operation, service personnel, agent, representative, or the like, thereby improving the operation of the conversational agent and improving user satisfaction. Conversational agent 306 keeps track of the call and once the first prioritized intent is complete, processes the next prioritized intent. In another embodiment, conversational agent 306 utilizes each identified segmentation along with the identified intent as additional training data for further training of conversational agent 306 thereby improving the operation of the conversations agent in analyzing later conversations and identifying multiple intents within the utterances of the conversation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
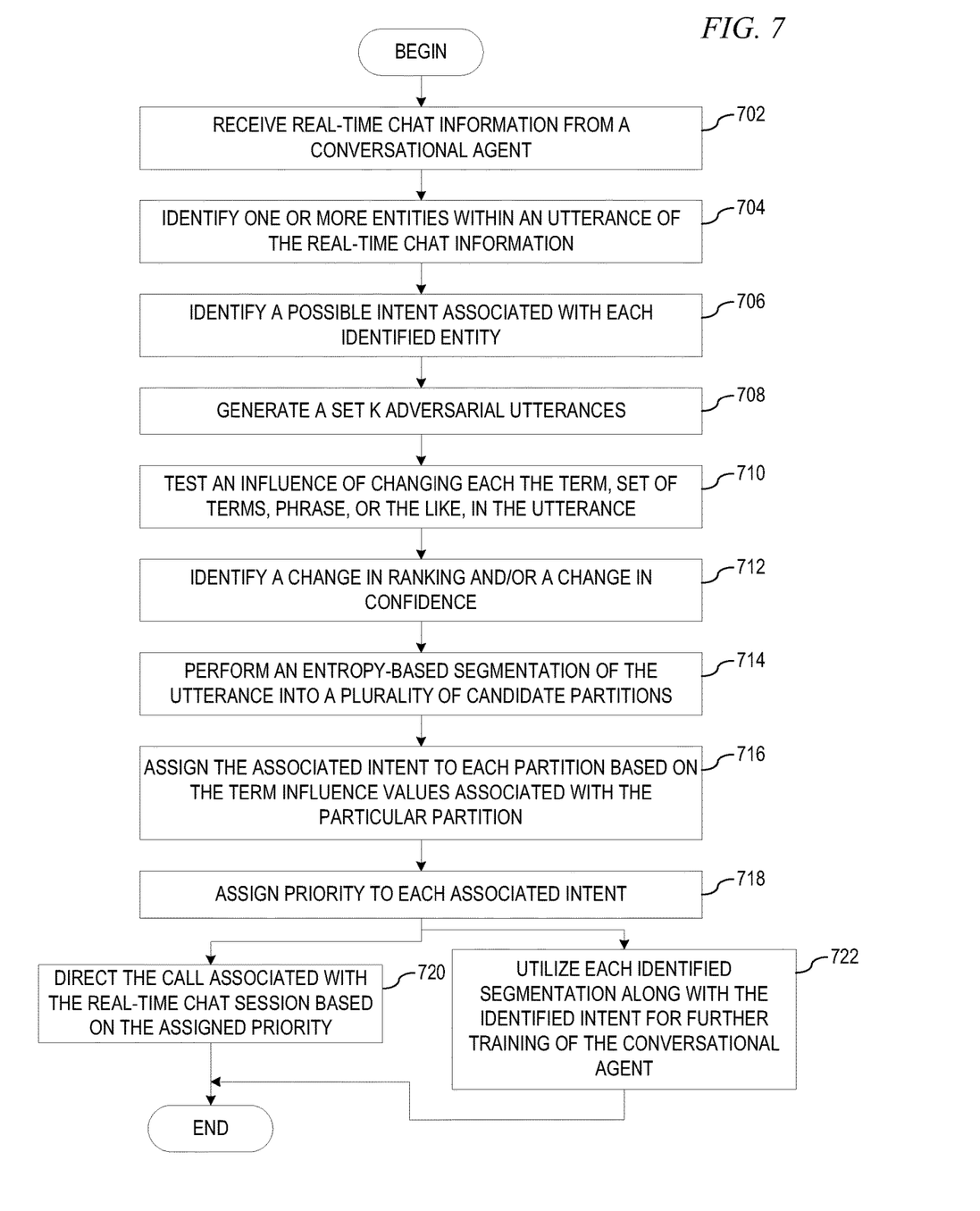
FIG. 7 depicts one example of a flowchart for the operations performed by an intent segmentation mechanism that segments intent boundaries for multi-intent utterances in a conversational agent in accordance with an illustrative embodiment.

FIG. 7 depicts one example of a flowchart for the operations performed by an intent segmentation mechanism that segments intent boundaries for multi-intent utterances in a conversational agent in accordance with an illustrative embodiment. As the operation begins, the intent segmentation mechanism receives real-time chat information from a conversational agent (step 702). The intent segmentation mechanism utilizes natural language processing to identify one or more entities within an utterance of the real-time chat information (step 704), the one or more entities defined specifically for business use cases by the customers, such as locations, organizations, times, or the like. The intent segmentation mechanism utilizes semantic classification, text classification, or the like, to identify a possible intent associated with each identified entity (step 706).

Given this utterance and with any number of identified intents greater than one (although the example only illustrates two entities), the intent segmentation mechanism generates a set K adversarial utterances (step 708) by removing each term, set of terms, phrase, or the like, and replacing the term, set of terms, phrase, or the like, with an alternative term, set of terms, phrase, or the like. That is, in generating the set K adversarial utterances, in one embodiment, the intent segmentation mechanism may utilize one or more different approaches to generate a set K adversarial utterances by, for example, replacing terms with paraphrasing terms, randomly sampling replacement words by language models, utilize replacement terms that involve typos, or the like.

The intent segmentation mechanism then tests an influence of changing each the term, set of terms, phrase, or the like, in the utterance (step 710) utilizing the following equations:

$$\Delta L = S_{before} - S_{after}$$

$$S = \alpha \frac{1}{\log(pos+1)} + \beta \cdot \text{confidence}$$

where $\Delta L$ is a result of a difference of a score before ($S_{before}$) the change of the term and a score after ($S_{after}$) the change of the term and the evaluation score S considers the effects of both position (pos) in the meaning prediction list for this meaning and the probability (confidence) of the meaning. That is, for each term in each sentence of the utterance, the intent segmentation mechanism changes the term, determines a meaning of the sentence, and compares that meaning to the original sentence so as to determine whether the meaning of the sentence has changed thereby indicating term importance. By testing the influence of changing a term, set of terms, phrase, or the like, in the utterance, the intent segmentation mechanism identifies one or more of a change in ranking of the intent of the utterance and/or a change in confidence with regard to the intent of the utterance (step 712). That is, if a word in the utterance is replaced with some random word(s) or the word is just deleted, an adversarial utterance is obtained that looks similar to the original utterance but the intent of the adversarial utterance may be ranked lower or be considered less confident than the original utterance or another adversarial utterance because an important word for the meaning was changed or lost.

Utilizing the completed term importance analysis, the intent segmentation mechanism performs an entropy-based segmentation of the utterance into a plurality of candidate partitions (step 714). While in some cases where the speech-to-text engine of the conversational agent is able to separate an utterance into grammatically based sentences, oftentimes the speech-to-text analysis may generate long sentences that have little or no punctuation. Therefore, while the intent segmentation mechanism may utilize punctuation to segment an utterance into a plurality of intents, the intent segmentation mechanism also operates to segment an utterance into a plurality of intents in utterances that contain little or no punctuation. For each candidate partition, the intent segmentation mechanism determines a probability of each intent base on summing the $\Delta L$s of all the terms. With the utterance segmented into the plurality of intents, the intent segmentation mechanism assigns the associated intent to each partition based on the term influence values associated with the particular partition (step 716).

Based on the candidate partition with minimum entropy, the intent segmentation mechanism assigns priority to that associated intent (step 718). In one embodiment, the conversational agent utilizes the assigned priority to direct the call associated with the real-time chat session to a further operation, service personnel, agent, representative, or the like (step 720), thereby improving the operation of the conversational agent and improving user satisfaction. In another embodiment, the conversational agent utilizes each identified segmentation along with the identified intent as additional training data for further training of the conversational agent (step 722), thereby improving the operation of the conversations agent in analyzing later conversations and identifying multiple intents within the utterances of the conversation. The operation terminates thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for segmenting intent boundaries for multi-intent utterances in a conversational agent. The intent segmentation mechanism identifies a set of top-K candidate intents within an utterance from a chat occurring within the conversation agent. The intent segmentation mechanism then performs term/token-level importance analysis for each top-K candidate intent. For all possible solutions of separating the utterance into K−1 segments, the intent segmentation mechanism detects boundaries for each intent by minimizing the entropy. After segmenting the utterance into multiple intents, the intent segmentation mechanism may perform two different operations. The first operation is to utilize the identified segmentation as additional training data for further training of the conversational agent thereby improving the operation of the conversations agent in analyzing later conversations and identifying multiple intents within the utterances of the conversation. The second operation is optimally handling the each identified intent. That is, based on the identified intents, intent segmentation mechanism priorities the intents and then provides direction of which intent to direct to which further operation, service personnel, agent, representative, or the like, in which order, thereby improving the operation of the conversational agent and improving user satisfaction.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the at least one processor to implement an intent segmentation mechanism that segments intent boundaries for multi-intent utterances in a conversational agent, the method comprising:
responsive to identifying one or more possible intents in an utterance from real-time chat information from a real-time chat session, for each term of a set of terms in the utterance, generating a set of adversarial utterances for the utterance;
determining an influence of changing each term by:
determining a meaning of the utterance without the alternative term;

determining a meaning of the utterance with the alternative term; and
comparing the meaning of the utterance without the alternative term to the meaning of the utterance with the alternative term so as identify a term importance value;
utilizing the term importance value of each term in the set of terms in the utterance, identifying one or more of a change in ranking of the intent of the utterance or a change in confidence with regard to the intent of the utterance;
utilizing the term importance value for each term in the set of terms in the utterance, performing entropy-based segmentation of the utterance into a plurality of candidate partitions;
assigning an associated intent based on ranking and confidence and entropy value to each segment of the utterance based on a sum of term importance values of the terms in the respective segment; and
based on a segment with minimum entropy, directing a call associated with the real-time chat session to an operation associated with the associated intent of the segment with minimum entropy.

2. The method of claim 1, further comprising:
responsive to completing a portion of the call associated with the intent of the segment with minimum entropy, directing the call associated with the real-time chat session to an further operation associated with an intent of the segment with next minimum entropy.

3. The method of claim 1, further comprising:
utilizing the identified segmentation along with the identified intent as additional training data for further training of the conversational agent.

4. The method of claim 1, wherein the one or more possible intents in the utterance from the real-time chat information are identified by the method comprising:
identifying one or more entities within the utterance using natural language processing; and
identifying a possible intent associated with each identified entity in the one or more entities utilizing one or more of semantic classification or text classification.

5. The method of claim 1, wherein generating the set of adversarial utterances for the utterance performs one or more of replacing terms with paraphrasing terms, randomly sampling replacement words by language models, or utilizing replacement terms that involve typos.

6. The method of claim 1, wherein generating the set of adversarial utterances for the utterance deletes a word from the utterance.

7. The method of claim 1, wherein determining the influence of changing each term utilizes the following equations:

$$\Delta L = S_{before} - S_{after}$$

$$S = \propto \frac{1}{\log(pos+1)} + \beta \cdot \text{confidence}$$

where is a result of a difference of a score before ($S_{before}$) the change of the term and a score after ($S_{after}$) the change of the term and the evaluation score S considers the effects of both position (pos) in the meaning prediction list for this meaning and the probability (confidence) of the meaning.

8. A computer program product comprising a computer readable storage medium having a computer readable program stored therein, wherein the computer readable program, when executed on a data processing system, causes the data processing system to implement an abnormal entity detection mechanism that facilitates detecting abnormal entities in real-time response systems through weak supervision, and further causes the data processing system to:
responsive to identifying one or more possible intents in an utterance from real-time chat information from a real-time chat session, for each term of a set of terms in the utterance, generate a set of adversarial utterances for the utterance;
determine an influence of changing each term by:
determining a meaning of the utterance without the alternative term;
determining a meaning of the utterance with the alternative term; and
comparing the meaning of the utterance without the alternative term to the meaning of the utterance with the alternative term so as identify a term importance value;
utilizing the term importance value of each term in the set of terms in the utterance, identify one or more of a change in ranking of the intent of the utterance or a change in confidence with regard to the intent of the utterance;
utilizing the term importance value for each term in the set of terms in the utterance, perform entropy-based segmentation of the utterance into a plurality of candidate partitions;
assign an associated intent based on ranking and confidence and entropy value to each segment of the utterance based on a sum of term importance values of the terms in the respective segment; and
based on a segment with minimum entropy, direct a call associated with the real-time chat session to an operation associated with the associated intent of the segment with minimum entropy.

9. The computer program product of claim 8, wherein the computer readable program further causes the data processing system to:
responsive to completing a portion of the call associated with the intent of the segment with minimum entropy, direct the call associated with the real-time chat session to an further operation associated with an intent of the segment with next minimum entropy.

10. The computer program product of claim 8, wherein the computer readable program further causes the data processing system to:
utilize the identified segmentation along with the identified intent as additional training data for further training of the conversational agent.

11. The computer program product of claim 8, wherein the one or more possible intents in the utterance from the real-time chat information are identified by the computer readable program further causing the data processing system to:
identify one or more entities within the utterance using natural language processing; and
identify a possible intent associated with each identified entity in the one or more entities utilizing one or more of semantic classification or text classification.

12. The computer program product of claim 8, wherein the computer readable program generates the set of adversarial utterances for the utterance by causing the data processing system to perform one or more of replacing terms with paraphrasing terms, randomly sampling replacement words by language models, or utilizing replacement terms that involve typos.

13. The computer program product of claim 8, wherein the computer readable program generates the set of adversarial utterances for the utterance by causing the data processing system to delete a word from the utterance.

14. The computer program product of claim 8, wherein the computer readable program determines the influence of changing each term by causing the data processing system to utilize the following equations:

$$\Delta L = S_{before} - S_{after}$$
$$S = \propto \frac{1}{\log(pos+1)} + \beta \cdot \text{confidence}$$

where is a result of a difference of a score before ($S_{before}$) the change of the term and a score after ($S_{after}$) the change of the term and the evaluation score S considers the effects of both position (pos) in the meaning prediction list for this meaning and the probability (confidence) of the meaning.

15. An apparatus comprising:
at least one processor; and
at least one memory coupled to the at least one processor, wherein the at least one memory comprises instructions which, when executed by the at least one processor, cause the at least one processor to implement an abnormal entity detection mechanism that facilitates detecting abnormal entities in real-time response systems through weak supervision, and further cause the at least one processor to:
responsive to identifying one or more possible intents in an utterance from real-time chat information from a real-time chat session, for each term of a set of terms in the utterance, generate a set of adversarial utterances for the utterance;
determine an influence of changing each term by:
    determining a meaning of the utterance without the alternative term;
    determining a meaning of the utterance with the alternative term; and
    comparing the meaning of the utterance without the alternative term to the meaning of the utterance with the alternative term so as identify a term importance value;
utilizing the term importance value of each term in the set of terms in the utterance, identify one or more of a change in ranking of the intent of the utterance or a change in confidence with regard to the intent of the utterance;
utilizing the term importance value for each term in the set of terms in the utterance, perform entropy-based segmentation of the utterance into a plurality of candidate partitions;
assign an associated intent based on ranking and confidence and entropy value to each segment of the utterance based on a sum of term importance values of the terms in the respective segment; and
based on a segment with minimum entropy, direct a call associated with the real-time chat session to an operation associated with the associated intent of the segment with minimum entropy.

16. The apparatus of claim 15, wherein the instructions further cause the at least one processor to:
responsive to completing a portion of the call associated with the intent of the segment with minimum entropy, direct the call associated with the real-time chat session to an further operation associated with an intent of the segment with next minimum entropy.

17. The apparatus of claim 15, wherein the instructions further cause the at least one processor to:
utilize the identified segmentation along with the identified intent as additional training data for further training of the conversational agent.

18. The apparatus of claim 15, wherein the one or more possible intents in the utterance from the real-time chat information are identified by the instructions further causing the at least one processor to:
identify one or more entities within the utterance using natural language processing; and
identify a possible intent associated with each identified entity in the one or more entities utilizing one or more of semantic classification or text classification.

19. The apparatus of claim 15, wherein the instructions generate the set of adversarial utterances for the utterance by causing the at least one processor to perform one or more of replacing terms with paraphrasing terms, randomly sampling replacement words by language models, or utilizing replacement terms that involve typos.

20. The apparatus of claim 15, wherein the instructions generate the set of adversarial utterances for the utterance by causing the at least one processor to delete a word from the utterance.

* * * * *